April 16, 1929.  C. PAYNE  1,709,035
MANUFACTURE OF VENEERED BLOCKS
Filed May 10, 1926
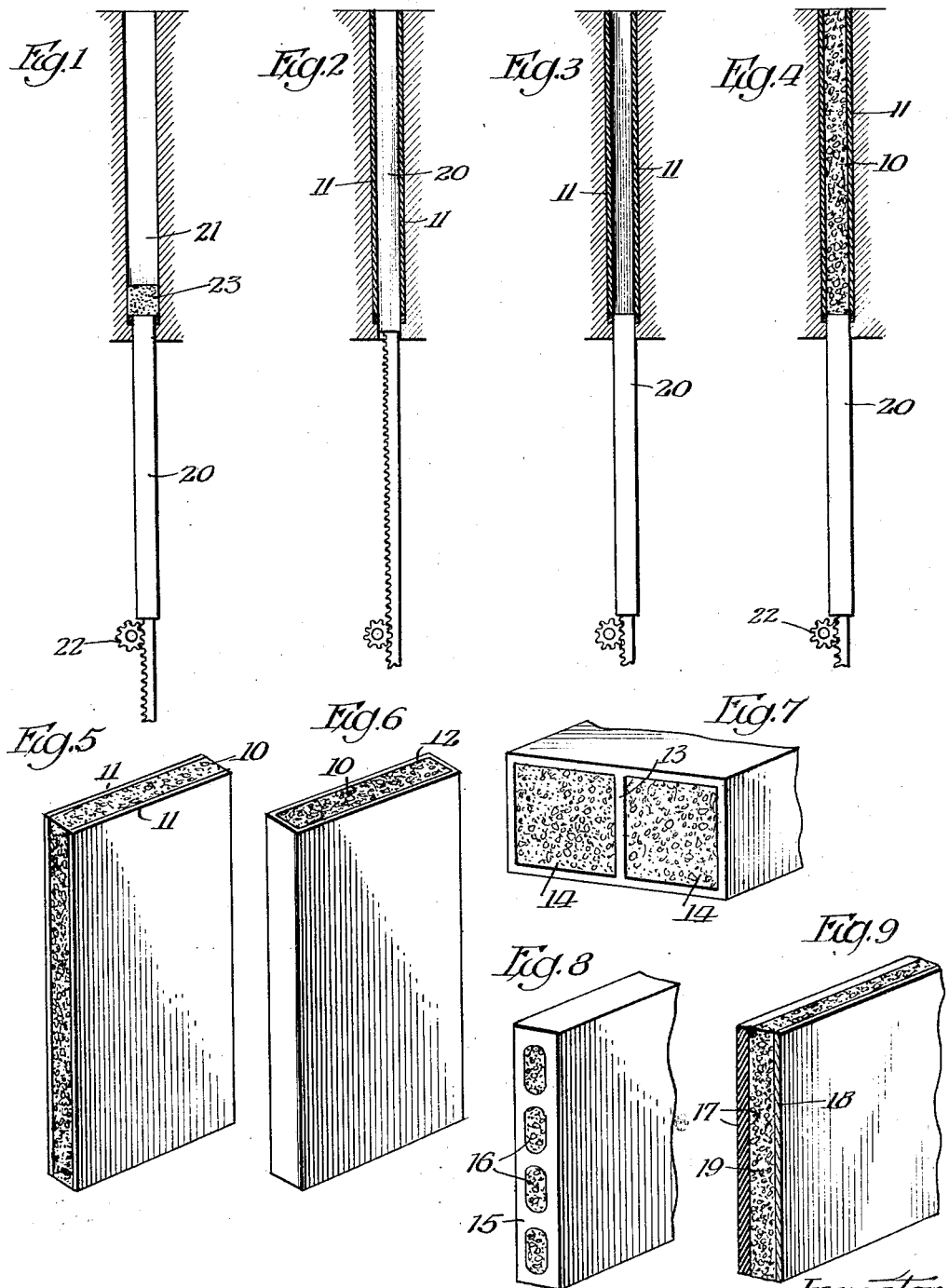

Patented Apr. 16, 1929.

1,709,035

UNITED STATES PATENT OFFICE.

CALEB PAYNE, OF CHICAGO, ILLINOIS, ASSIGNOR TO GYPSUM ENGINEERING & MANUFACTURING CO., OF CHICAGO, ILLINOIS, A CORPORATION OF ILLINOIS.

MANUFACTURE OF VENEERED BLOCKS.

Application filed May 10, 1926. Serial No. 107,855.

This invention relates to the manufacture of veneered blocks and its object is to provide a light block which can be made in any desired size for use as partition tile, floor tile, or other structural purposes.

Another object of the invention is to provide an insulating block of cellular structure with a protective and strengthening veneer to facilitate shipping and handling and to enable its use for structural and other purposes.

The invention has other objects in view which will appear hereafter in the description of the invention, reference being made to the accompanying drawings which illustrate diagrammatically such parts of an apparatus as are directly involved in the manufacture of the blocks.

Referring to the drawings:

Fig. 1 is a sectional elevation of a mold with a charge of liquid stucco and prepared to make the veneer.

Fig. 2 shows the plunger core of Fig. 1 thrust into the mold to make the veneer.

Fig. 3 shows the core withdrawn from the mold.

Fig. 4 shows the body cast in the veneer.

Fig. 5 is a perspective view of the completed block.

Figs. 6 to 9 show other forms of blocks.

My present invention contemplates the manufacture of a block having a body 10 composed of a light cellular material and protected on one or more sides with a veneer 11 of a harder, denser, material The veneer may be used as a facing on one side only, but I prefer to provide it on the opposite sides of a block suitable for insulating and structural purposes, as shown in Fig. 5. For many purposes it will be desirable to protect the block with a veneer on four sides in the form of a shell 12, as shown in Fig. 6, and for floor tile or other purposes it will be found convenient to make twin blocks having a partition 13 dividing the body into two spaced sections 14, as shown in Fig. 7. The block may be made in the form of a partition tile having a veneer 15 (Fig. 8) and a plurality of separated sections 16 of the body material. Instead of making the veneer and casting the body thereon or therein immediately after the veneer is made, I may precast the veneer of cement, terra cotta or other material to form a facing for the block and the body may be cast on this facing, or on this facing with other veneer, as desired. In Fig. 9 the block has a cement facing 17, a gypsum veneer 18 and a cellular body 19.

I have illustrated diagrammatically means which may be employed for making a veneered block in accordance with my invention. It will be understood that the block may be in the form of a building block, a floor tile, a partition tile, or in any other form, size and shape suitable for structural or insulating purposes and, of course, the mold and other parts of the apparatus will be made to produce the product desired. I will describe the apparatus as made to produce a block with veneer on its sides, as shown in Fig. 5, and referring to Figs. 1–5 a plunger core 20 is arranged to be reciprocated in a mold 21 by suitable operating means 22. In this particular adaptation of the invention a supply of liquid stucco 23 is poured into the mold when the core is in its lowest position, and then the core is thrust upward in the mold to the position shown in Fig. 2. The ends of the core fit snugly against the ends of the mold cavity; the sides of the core and the sides of the mold cavity are spaced from each other to form the veneer 11. The core is of sufficient length so that its bottom or lower end will not rise above the bottom or lower end of the mold cavity. Then the core is withdrawn from the mold leaving the two veneers 11 in the mold cavity oppositely disposed. In this illustration the veneers are at opposite sides of the mold cavity to be located on opposite sides of the block. The top of the core forms a bottom for the mold cavity when the core is withdrawn, as shown in Fig. 3 and then the material to form the body 10 of the block is poured into the mold cavity where it bonds to the veneers 11 and forms a complete block which is then discharged from the mold. As thus described the core is smaller in one transverse dimension that the corresponding dimension of the mold cavity, to form opposite veneers 11; but it will readily be understood that if the core is made smaller in two transverse dimensions than the corresponding dimensions of the mold cavity a shell 12 (Fig. 6) will be produced; and that a floor tile, as shown in Fig. 7, or a partition tile, as shown in Fig. 8, may be made by providing an appropriate mold and core, and that the form of the product may be varied by varying the mold and the core. It will also be understood that a pre-cast slab or veneer 17 may be arranged in the mold and the body 10 cast thereon; or this slab 17 may be arranged in the mold of Fig. 1, and then a veneer 18 may be made opposite the slab 17 in the manner heretofore described after which the body may be cast between the slab and veneer 17, 18 and bonded thereto. Or the slab 17 may be made to form one side of a shell like 12 (Fig. 6), or one side of a twin shell (Fig. 7).

I contemplate using a foamaceous material for making a cellular body for the block. This material is of a character which can be reduced to a pouring consistency and which will be converted into foam when it is poured into the mold, and in foaming the material is distributed in a substantially uniform manner in the mold to form a cellular body of substantially uniform cellular structure. The term "cellular" as used herein means composed of many small closed cells or cavities, as distinguished from porous or spongy. An unprotected body made of this material is relatively delicate in structure and cannot be shipped or handled in a practical manner; but when the body is protected in accordance with my invention it can be shipped and handled as an article of manufacture and it is highly desirable for many different uses for insulating and structural purposes. In view of the great variety of uses of which the invention is capable I consider it sufficient to show and describe a simple embodiment for I believe that this will be sufficient indication to the persons skilled in the art of the many different forms in which the invention may be embodied and of the uses to which it may be put. It will readily be understood that for most purposes it will be desirable to veneer both sides of the block, to protect the block in shipping and handling; and that for many purposes it will be desirable to veneer both sides and the side edges of the block, leaving the end or top and bottom edges raw, but for some purposes it may be sufficient to veneer one side only of the block. I contemplate making the veneer of gypsum stucco, and this veneer is made in the mold preliminary to making the body. And it is possible to proceed with the body forming step at or about the time of initial set of the gypsum stucco, so that the operation of making the block can be conducted with rapidity and economy. I do not limit myself with respect to the thickness of the veneer or the size or the shape of the block, but I expect to provide a gypsum stucco veneer about one-quarter of an inch thick for a thirty inch building partition tile of standard shape. The veneer protects the cellular body, provides a block having sufficient strength for the purpose intended, and for shipping and handling, and prevents the block from crushing. The veneer also has the very important advantage that it enables the block to be removed from the mold without damage to the block. I use the word "block" in this description to indicate an article of any size or shape in which the invention may be embodied for insulating or structural purposes and including floor tile, partition tile and other forms besides those herein shown and referred to. Gypsum stucco is a desirable material for making the veneer but I do not restrict the invention thereto because other materials, including magnesite, Portland cement, and lime stucco compositions may also be used. It is possible to change the apparatus and the steps in the method of making the block in some particulars and I reserve the right to make all such changes as fairly fall within the scope of the following claims.

I claim:

1. A composition block comprising relatively thin masonry side walls, and a body of foamaceous material disposed between said side walls and bonded thereto to form an integral block, said foamaceous material forming a substantially uniform cellular structure.

2. A composition block comprising a relatively thin masonry wall and a body of foamaceous material on a side thereof and bonded thereto to form an integral block, said foamaceous material being of substantially uniform cellular structure the cells thereof being closed.

CALEB PAYNE.